J. HAW.
SAWMILL.
No. 17,626. Patented June 23, 1857.
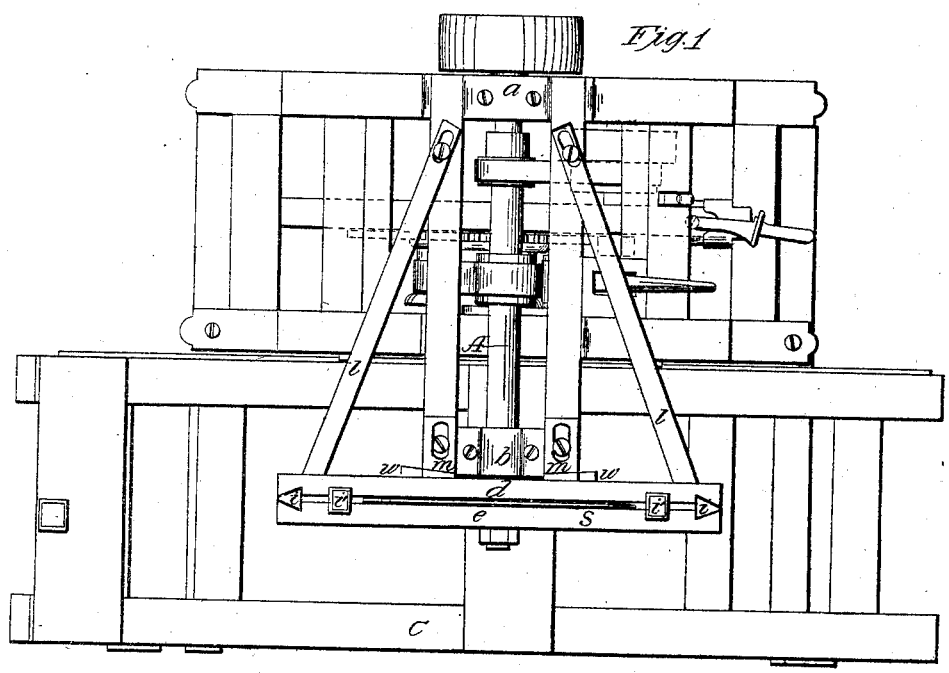
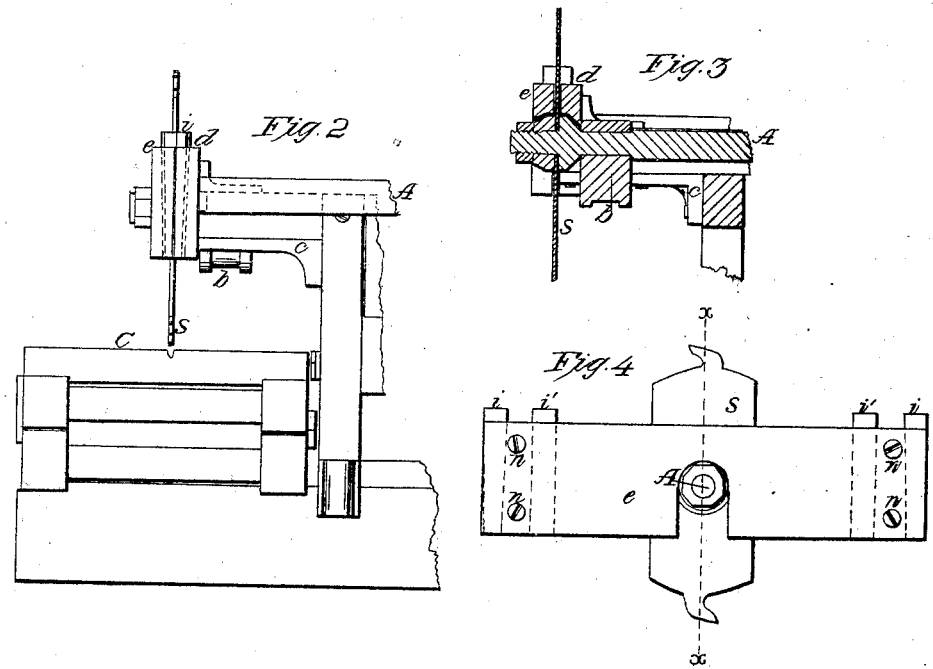

UNITED STATES PATENT OFFICE.

JOHN HAW, OF OLD CHURCH, VIRGINIA.

PICKET-SAWING MACHINE.

Specification of Letters Patent No. 17,626, dated June 23, 1857.

*To all whom it may concern:*

Be it known that I, JOHN HAW, of Old Church, in the county of Hanover and State of Virginia, have invented a new and useful Improvement in Sawmills; and I do hereby declare that the following is a full, clear, and exact description of the construction and operation of the same, reference being had to the annexed drawing, forming part of this specification, in which—

Figure 1 is a top view of the sawmill. Fig. 2 is a view showing the saw between the guides. Fig. 3 is a section on $x\ x$ of Fig. 4 taken through the axes of saw shaft. Fig. 4 is a face view of the saw guides.

Similar letters of reference denote the same part.

My invention is an improvement in what is denominated "picker mills" and consists in the overhanging of the saw between braced guides, the space between which is adjustable by certain devices hereinafter to be set forth.

In the drawing A is the saw shaft and S the saw. This shaft has its bearings at $a$ on the frame and in the overhanging box $b$, connected with the braces $c$. The saw is inclosed between the guide pieces $d$ and $e$, separated by the wedges $i\ i'$. The guide piece $d$ is connected with the main frame by the braces $l$ and $m$. The slots in said braces permitting them to move upon the frame, when by the wear on the inside surfaces of the said guides it is necessary to bring the guides closer together. This adjustment is effected by driving up the wedges $i\ i'$ and drawing the plates together by the bolts $n$, the bolt connections of the braces being loosened to permit the movement of the guide piece $d$; and tightened when adjustment is complete. The wedges $w$ drive up the piece $d$.

C is the saw carriage which brings the log within the action of the saw as in other mills.

The overhanging of the saw renders it easy to adjust the log on the carriage, and as in this kind of mills guides like $d$ and $e$ are necessary; the plan here proposed furnishes a ready adjustment.

I claim—

As an improvement in picker saw mills, the overhanging of the saw between braced guides $d$ and $e$, the space between which is adjustable by wedges $i\ i'$ and slotted braces $l$ and $m$, operating as specified.

In testimony whereof, I have hereunto signed my name before two subscribing witnesses.

JOHN HAW.

Witnesses:
   GEO. PATTEN,
   JOHN S. HOLLINGSHEAD.